United States Patent
Onishi et al.

(10) Patent No.: US 10,259,402 B2
(45) Date of Patent: Apr. 16, 2019

(54) NOISE REDUCTION MEMBERS FOR MOTOR VEHICLE FENDERS

(71) Applicant: NISHIKAWA RUBBER CO., LTD., Hiroshima (JP)

(72) Inventors: Nobukazu Onishi, Hiroshima (JP); Yoshihiro Kohara, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 20 days.

(21) Appl. No.: 15/638,584

(22) Filed: Jun. 30, 2017

(65) Prior Publication Data

US 2018/0009398 A1 Jan. 11, 2018

(30) Foreign Application Priority Data

Jul. 5, 2016 (JP) .................................. 2016-133352
May 19, 2017 (JP) .................................. 2017-100116

(51) Int. Cl.
| | | |
|---|---|---|
| B62D 33/00 | (2006.01) | |
| B60R 13/08 | (2006.01) | |
| B32B 3/28 | (2006.01) | |
| B32B 5/18 | (2006.01) | |
| B32B 27/08 | (2006.01) | |

(52) U.S. Cl.
CPC ............ *B60R 13/0815* (2013.01); *B32B 3/28* (2013.01); *B32B 5/18* (2013.01); *B32B 27/08* (2013.01); *B60R 13/0861* (2013.01); *B32B 2307/102* (2013.01)

(58) Field of Classification Search
CPC ... B60R 13/0815; B60R 13/0861; B32B 3/28; B32B 5/18; B32B 27/08; B32B 2307/102
See application file for complete search history.

(56) References Cited

U.S. PATENT DOCUMENTS

| | | | | |
|---|---|---|---|---|
| 5,575,121 A | * | 11/1996 | Lajaunie ............... | E01F 8/0029 181/210 |
| 9,162,747 B2 | * | 10/2015 | Maze ....................... | B32B 3/12 |
| 2006/0214474 A1 | * | 9/2006 | Omiya ................. | B60R 13/0861 296/198 |
| 2010/0156142 A1 | * | 6/2010 | Sumitani .............. | B62D 25/161 296/180.1 |
| 2010/0213737 A1 | * | 8/2010 | Hirano .................. | B62D 25/16 296/181.5 |
| 2015/0034414 A1 | | 2/2015 | Arata et al. | |
| 2015/0239208 A1 | * | 8/2015 | Basela ...................... | B32B 5/18 428/317.7 |

FOREIGN PATENT DOCUMENTS

| | | | |
|---|---|---|---|
| JP | 3048125 U | | 2/1998 |
| JP | 2004168174 A | * | 6/2004 |
| JP | 2004168174 A | * | 6/2004 |
| JP | 2010-115985 A | | 5/2010 |
| JP | 2004-26060 A | | 1/2014 |
| JP | 2014-28515 A | | 2/2014 |

\* cited by examiner

*Primary Examiner* — Lori L Lyjak
(74) *Attorney, Agent, or Firm* — Renner Otto Boisselle & Sklar, LLP

(57) ABSTRACT

Disclosed herein is a technique for further improving the quietness in a vehicle cabin while reducing an increase in the weight of a motor vehicle. A noise reduction member, arranged in a fender inner space defined between a fender panel serving as an exterior panel for a motor vehicle and an inner fender forming a wheelhouse, includes a pair of wall portions which are made of a foamed material and arranged to be spaced apart from each other.

7 Claims, 18 Drawing Sheets

NOISE REDUCTION MEMBERS FOR MOTOR VEHICLE FENDERS

CROSS-REFERENCE TO RELATED APPLICATION

This application claims priority to Japanese Patent Application No. 2016-133352 filed on Jul. 5, 2016 and Japanese Patent Application No. 2017-100116 filed on May 19, 2017, the entire disclosures of which are hereby incorporated by reference.

BACKGROUND ART

The present disclosure relates to noise reduction members for motor vehicle fenders, and more particularly relates to the field of technology of a structure for reducing the noise entering a vehicle cabin.

In general, each fender of a motor vehicle includes a fender panel serving as an exterior panel for the motor vehicle and an inner fender forming a wheelhouse. A fender inner space is defined between the fender panel and the inner fender. Note that a motor vehicle includes a plurality of fenders. One pair of fenders arranged closer to its front wheels is called "front fenders," while another pair of fenders arranged closer to its rear wheels "rear fenders." When it is not necessary to distinguish the front and rear fenders from each other, they are simply called "fenders" collectively.

The front fender inner spaces, communicating with a front grille, sometimes allow noise to enter the front fender inner spaces from outside the vehicle cabin though the front grille. Also, the front fender inner spaces are adjacent to the motor vehicle's engine compartment, thus allowing noise inside the engine compartment to enter the front fender inner spaces easily. Furthermore, the front fender inner spaces are also adjacent to the motor vehicle's wheelhouses, thus also allowing road noise, generated while the motor vehicle is running, to enter the front fender inner spaces easily. Meanwhile, the rear fender inner spaces are adjacent to the motor vehicle's exhaust system, and therefore, allow noise inside the exhaust system to enter the rear fender inner space easily.

Furthermore, the rear end of the front fender inner spaces is only separated from the vehicle cabin via a panel, for example, and therefore, the noise entering the front fender inner spaces reaches the vehicle cabin easily. Moreover, the location of each front fender inner space, close to the motor vehicle's entrance to be opened and closed with a front door arranged on one side of the motor vehicle body, also allows the noise in the front fender inner space to easily enter the vehicle cabin from the motor vehicle's entrance by transmitting though the door's seal member, thus sometimes disturbing quietness in the vehicle cabin. Likewise, the noise entering the rear fender inner spaces will no less easily enter the vehicle cabin located in front of the rear fender inner spaces. As structures for improving the quietness in the vehicle cabin, known are the ones disclosed in the following four patent documents, for example.

Specifically, Japanese Unexamined Patent Publication No. 2014-28515 attaches a soundproofing material, formed in the shape of a plate extending along the upper surface of an inner fender, to the upper surface of the inner fender, thereby attempting to reduce the engine noise and the road noise.

Japanese Utility Model Publication No. 3048125 arranges a cushion member formed in the shape of a vertically elongated flat plate in a rear region of a fender inner space.

Japanese Unexamined Patent Publication No. 2004-26060 attaches a sound insulation material, formed in the shape of a vertically elongated flat plate, to the gap between a front fender panel and a pillar panel with some fitting members.

Japanese Unexamined Patent Publication No. 2010-115985 provides a seal member with two sponge portions in a space partitioned and defined by a front fender panel, a fender apron lower member, and a fender apron upper member over and away from an inner fender.

SUMMARY

Recently, there have been growing demands for an even higher degree of quietness in the vehicle cabin, while at the same time, there have also been rising demands for motor vehicles with an even lighter weight. To meet these two kinds of demands at a time, an increase in the weight of a motor vehicle needs to be minimized, even when the sound absorption or sound insulation material as disclosed in the documents mentioned above is provided.

However, according to Japanese Unexamined Patent Publication No. 2014-28515, the soundproofing material is just attached to the upper surface of an inner fender. Thus, there is a concern about the noise that has entered a fender inner space from the front reaching a rear region of the fender inner space and eventually entering the vehicle cabin through an entrance without being reduced.

This concern could be alleviated by provision of a cushion member in the rear region of a fender inner space as proposed in Japanese Utility Model Publication No. 3048125. However, the cushion member, having a simple flat plate shape, would certainly achieve some sound insulation effect but would not achieve so high a sound absorption effect. The same can be said about the sound insulation material disclosed in Japanese Unexamined Patent Publication No. 2004-26060.

Furthermore, the seal member disclosed in Japanese Unexamined Patent Publication No. 2010-115985 includes a substrate and a pair of sponge plates sandwiching the substrate on both sides, thus complicating the manufacturing process. In addition, just like Japanese Utility Model Publication No. 3048125 and Japanese Unexamined Patent Publication No. 2004-26060, the final form of the product is a simple single flat plate, of which the sound absorption effect would not be so high.

The present disclosure provides a technique for further improving the quietness in a vehicle cabin while reducing an increase in the weight of a motor vehicle.

Specifically, according to the present disclosure, attaching a member made of a foamed material and having a multi-wall structure with a gap to a surface facing a fender inner space contributes to sufficient absorption of noise in the fender inner space, regardless of its light weight, and a significant increase in sound insulation ability at the same time.

A first aspect of the present disclosure is directed to a noise reduction member arranged in a fender inner space defined between a fender panel serving as an exterior panel for a motor vehicle and an inner fender forming a wheelhouse.

The noise reduction member includes a first wall portion and a second wall portion which are made of a foamed material, attached to a surface facing the fender inner space, such as a portion of the motor vehicle body or an inner fender, to extend in such a direction as to protrude from the surface, and arranged to be spaced apart from each other.

According to this configuration, the first and second wall portions form a multi-wall structure by extending in the fender inner space in such a direction as to protrude from the surface facing the fender inner space. Therefore, irrespective of its light weight, the noise reduction member can still reduce leakage of noise out of the fender inner space, thus enhancing sound insulation effects. In addition, the noise reduction member has a lightweight structure, and has the noise in the fender inner space absorbed into both of the first and second wall portions, which are made of a foamed material. This ensures a broad sound absorption area and enhances the sound absorption performance.

A second aspect of the present disclosure is an embodiment of the first aspect. In the second aspect, a surface of the foamed material may include a solid skin layer.

That is to say, the solid skin layer functions as a sound insulation wall. Furthermore, rain water, carwash water, or any other kind of water sometimes externally enters the fender inner space and may be deposited on the first and/or second wall portion(s). Even in such a situation, the solid skin layer coating the surface of the foamed material substantially prevents the water deposited on the first and/or second wall portion(s) from permeating, thus curbing a decline in sound insulation and sound absorption performances.

A third aspect of the present disclosure is an embodiment of the first or second aspect. In the third aspect, the noise reduction member may be formed by pleating the foamed material.

This configuration forms a plurality of first wall portions and a plurality of second wall portions, thus enhancing the sound insulation and sound absorption performances. In addition, pleating the foamed material facilitates the manufacturing of the noise reduction member as well.

A fourth aspect of the present disclosure is an embodiment of the third aspect. In the fourth aspect, the first wall portion and the second wall portion may be arranged to be spaced apart from each other in a longitudinal direction of the motor vehicle.

This configuration allows the noise in the fender inner space to be shut off by the first and second wall portions, thus significantly reducing the leakage of the noise out of the fender inner space toward the vehicle cabin and the entrances of the motor vehicle body.

A fifth aspect of the present disclosure is an embodiment of any one of the first to fourth aspects. In the fifth aspect, a sound absorbing material may be arranged between the first wall portion and the second wall portion.

According to this configuration, the sound absorbing material absorbs the noise that has entered the gap between the first and second wall portions, thus reducing the noise leaking out of the fender inner space. In addition, the sound absorbing material also reduces the deformation of the first and second wall portions, thus allowing the first and second wall portions to maintain high sound insulation performance for a long time.

A sixth aspect of the present disclosure is an embodiment of any one of the first to fifth aspects. In the sixth aspect, the noise reduction member may further include a rear noise reduction member including a plurality of wall portions made of a foamed material, arranged in the fender inner space to extend vertically, and arranged to be spaced apart from each other in the longitudinal direction of the motor vehicle.

According to this configuration, the rear noise reduction member extending vertically in the fender inner space further reduces the noise leaking out of the fender inner space toward the vehicle cabin or the motor vehicle entrances. This further enhances the sound insulation effect of the noise in the fender inner space.

A seventh aspect of the present disclosure is an embodiment of any one of the first to sixth aspects. In the seventh aspect, the noise reduction member may include a plurality of plate members made of a foamed material and a coupling member having an insert portion to be inserted into the plate members and configured to couple and combine together the plate members. The insert portion of the coupling member is plugged into, and fixed to, a surface facing the fender inner space of the motor vehicle.

According to this configuration, the plurality of plate members forming part of the noise reduction member are combined together via the coupling member. Plugging the insert portion of this coupling member into the surface facing the fender inner space such as an inner fender, or some part of the motor vehicle body such as a front side frame, allows the noise reduction member to be fixed onto that member.

An eighth aspect of the present disclosure is an embodiment of any one of the first to seventh aspects. In the eighth aspect, the noise reduction member may further include a hard plate member made of a harder material than the first and second wall portions. The hard plate member is arranged along, and supports, the first and second wall portions.

According to the first aspect of the present disclosure, the first and second wall portions, arranged to be spaced apart from each other, extend in such a direction as to protrude from the surface facing the fender inner space. Therefore, regardless of its light weight, the noise reduction member can still enhance sound insulation effects of the noise in the fender inner space. In addition, the first and second wall portions are made of a foamed material, thus ensuring a broad sound absorption area and enhancing the sound absorption performance while reducing the weight of the structure. This further improves the quietness in the vehicle cabin while reducing an increase in the weight of the motor vehicle.

According to the second aspect of the present disclosure, the foamed material includes a solid skin layer, which functions as a sound insulation wall. Furthermore, water may be deposited on the first and/or second wall portion(s) but does not permeate. This curbs a decline in sound insulation and sound absorption performances, and improves the quietness in the vehicle cabin for a long time.

According to the third aspect of the present disclosure, pleating the foamed material facilitates the manufacturing of the noise reduction member. In addition, forming a plurality of first wall portions and a plurality of second wall portions enhances the sound insulation and sound absorption performances.

According to the fourth aspect of the present disclosure, the first wall portion and the second wall portion are arranged to be spaced apart from each other in a longitudinal direction of the motor vehicle. This significantly reduces the leakage of the noise out of the fender inner space toward the vehicle cabin and the entrances of the motor vehicle body, thus further improving the quietness in the vehicle cabin.

According to the fifth aspect of the present disclosure, a sound absorbing material is arranged between the first wall portion and the second wall portion. This further enhances the sound absorption performance. In addition, the sound absorbing material also reduces the deformation of the first and second wall portions, thus allowing the first and second wall portions to maintain high sound insulation performance for a long time. This further improves the quietness in the vehicle cabin.

According to the sixth aspect of the present disclosure, the wall portions of the rear noise reduction member extending vertically in the fender inner space further enhance the sound insulation effect of the noise in the fender inner space, and further improve the quietness in the vehicle cabin.

According to the seventh aspect of the present disclosure, the plurality of plate members forming part of the noise reduction member are combined together via the coupling member. This coupling member allows the noise reduction member to be fixed onto the surface facing the fender inner space such as an inner fender or some part of the motor vehicle body.

According to the eighth aspect of the present disclosure, the hard plate member significantly reduces the deformation of the first and second wall portions, thus allowing the first and second wall portions to maintain high sound insulation and sound absorption performances for a long time.

DETAILED DESCRIPTION (First Embodiment)

Figure 1:
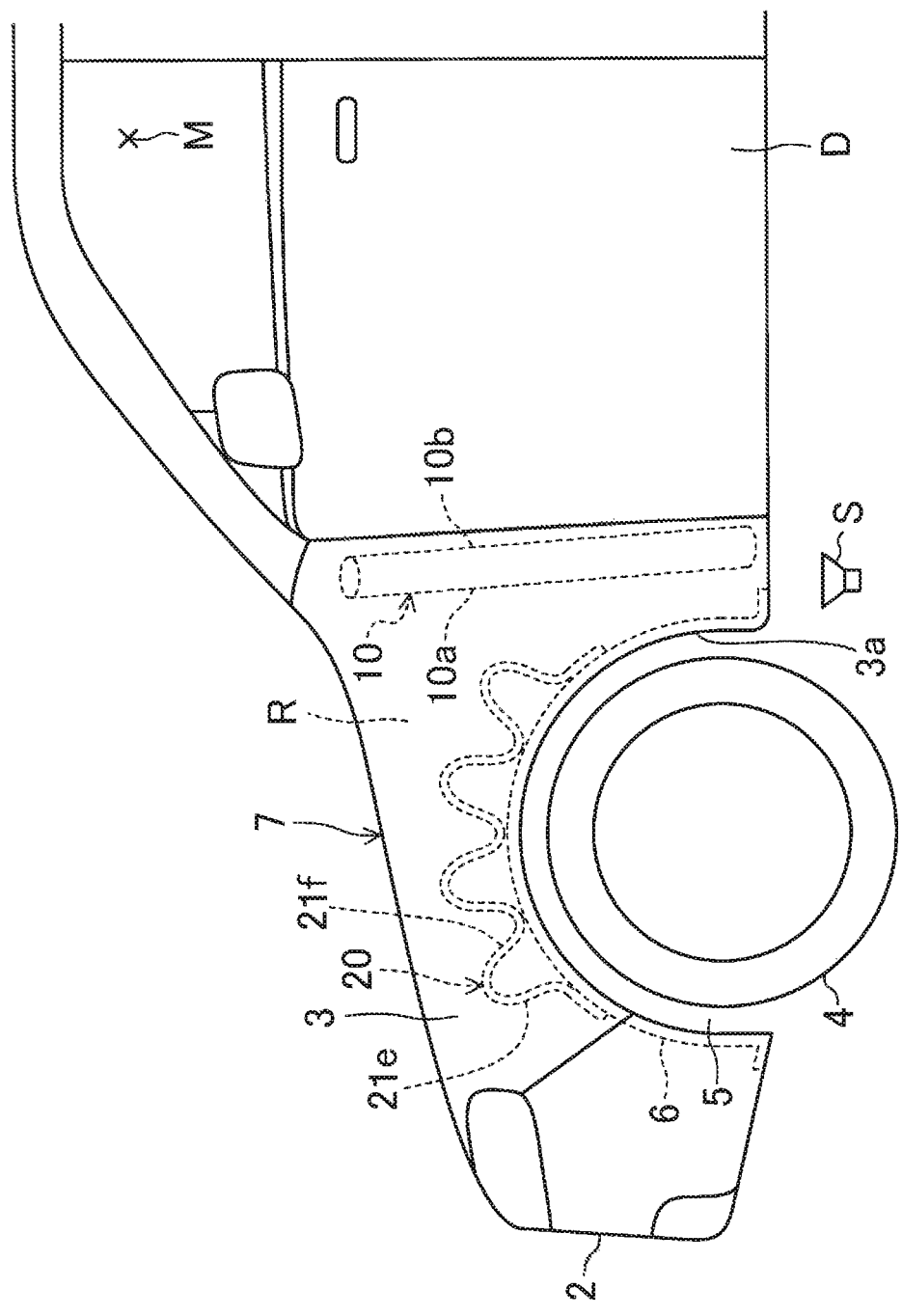
FIG. 1 is a front left side view of a motor vehicle including a front-fender noise reduction member according to a first embodiment.

FIG. 1 is a front left side view of a motor vehicle 1 including a front-fender noise reduction member 20 according to a first embodiment of the present disclosure. In the following description of embodiments, the front side of the motor vehicle will be hereinafter simply referred to as "front," the rear side thereof "rear," the left side thereof "left," and the right side thereof "right," respectively.

(Configuration of Motor Vehicle's Front)

The motor vehicle 1 is a so-called "passenger car" and is provided with an engine compartment (not shown) equipped with an engine and other parts in the front. Behind that engine compartment, there is a vehicle cabin to seat an occupant and passengers. The engine compartment and the vehicle cabin are separated from each other by a dash panel. The motor vehicle 1 is provided with a front bumper 2 at the frontend thereof. The front bumper 2 has an opening for letting cooling air into the engine compartment. The motor vehicle 1 also has entrances (not shown), which are provided on both sides and each of which is opened and closed with a front door D. Furthermore, a seal member (not shown) made of a known elastic material is provided between each entrance of the vehicle body and a peripheral portion of an associated front door D.

Figure 3:
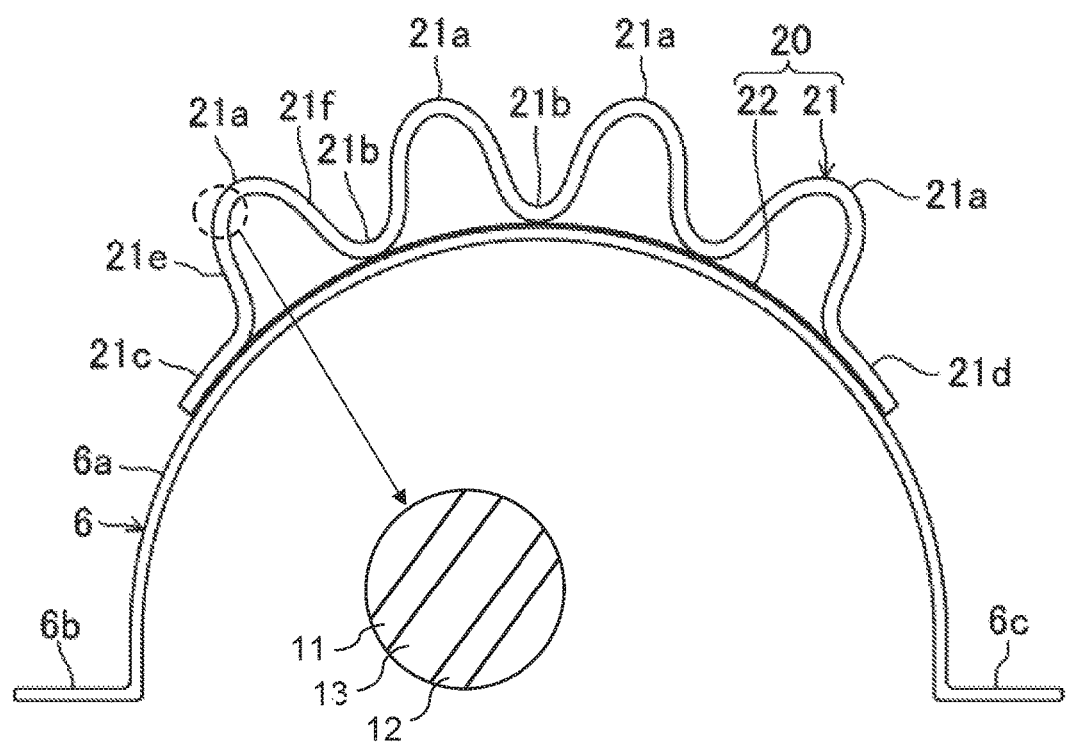
FIG. 3 is a side view of an inner fender including, as an attachment, a front-fender noise reduction member.

Behind the front bumper 2, provided on the right and left sides are fender panels 3 functioning as a pair of exterior panels at the frontend of the motor vehicle 1. The lower edge 3a of each fender panel 3 is formed in an upwardly curved shape corresponding to that of an associated front wheelhouse 5 formed to house an associated front wheel 4. At the frontend of the motor vehicle 1, provided are inner fenders 6, each forming an associated wheelhouse 5. The inner fenders 6 are plate members made of a resin material. As also shown in FIG. 3, the inner fender 6 on the left side of the vehicle body includes an upwardly curved plate portion 6a, a front side plate portion 6b extending forward from the frontend of the curved plate portion 6a, and a rear side plate portion 6c extending backward from the rear end of the curved plate portion 6a. The curved plate portion 6a and the front and rear side plate portions 6b, 6c have been molded integrally with each other. The curved plate portion 6a is formed to extend along the lower edge 3a of the associated fender panel 3. The curved plate portion 6a, front side plate portion 6b, and rear side plate portion 6c are fixed at respective predetermined points onto the fender panel 3 or some parts of the vehicle body.

Each fender panel 3 and its associated inner fender 6 form a front fender 7. The fender panel 3, serving as an exterior panel for the motor vehicle 1, is formed to bulge leftward in FIG. 1. A fender inner space R is defined between each fender panel 3 and an associated inner fender 6. A fender apron (not shown) is provided inward of the fender inner space R in the vehicle (i.e., closer to the engine compartment), and separates the engine compartment from the fender inner space R. That is to say, the fender inner space R is defined by the fender panel 3, the inner fender 6, and the fender apron.

The fender inner space R is defined to extend from the frontend through the rear end of the fender panel 3. The front of the fender inner space R communicates with the opening of the front bumper 2. On the other hand, the rear of the fender inner space R is located close to the front of an entrance of the motor vehicle 1 and the front of the front door D, and is at least partially opened backward.

In addition, the upward curvature of the curved plate portion 6a of the inner fender 6 makes the vertical dimension of the fender inner space R increase both toward the front of the fender inner space R and toward the rear thereof. At the top of the curved plate portion 6a, the vertical dimension of the fender inner space R becomes the shortest.

The front of the fender inner space R, communicating with the opening of the front bumper 2, sometimes allows noise to enter the fender inner space R from outside of the vehicle cabin through the opening. Also, the fender inner space R is adjacent to the engine compartment, thus allowing noise inside the engine compartment to enter the fender inner space R easily. Furthermore, the fender inner space R is adjacent to the wheelhouse 5, thus also allowing road noise, generated while the motor vehicle is running, to enter the fender inner space R easily. Note that the right side of the vehicle has the same configuration as the left side thereof, and description thereof will be omitted herein.

(Configuration of Noise Reduction Member)

In the fender inner space R of the motor vehicle 1, arranged is a front-fender noise reduction member 20. In this embodiment, the front-fender noise reduction member 20 is combined with a rear noise reduction member 10, which is also arranged in the fender inner space R. The rear noise reduction member 10 and the front-fender noise reduction member 20 are arranged at different positions in the fender inner space R, and have different structures. However, both have a sound absorption property that absorbs the noise in the fender inner space R and a sound insulation property that makes the noise in the fender inner space R difficult to transmit toward the entrance of the motor vehicle 1.

Figure 2:
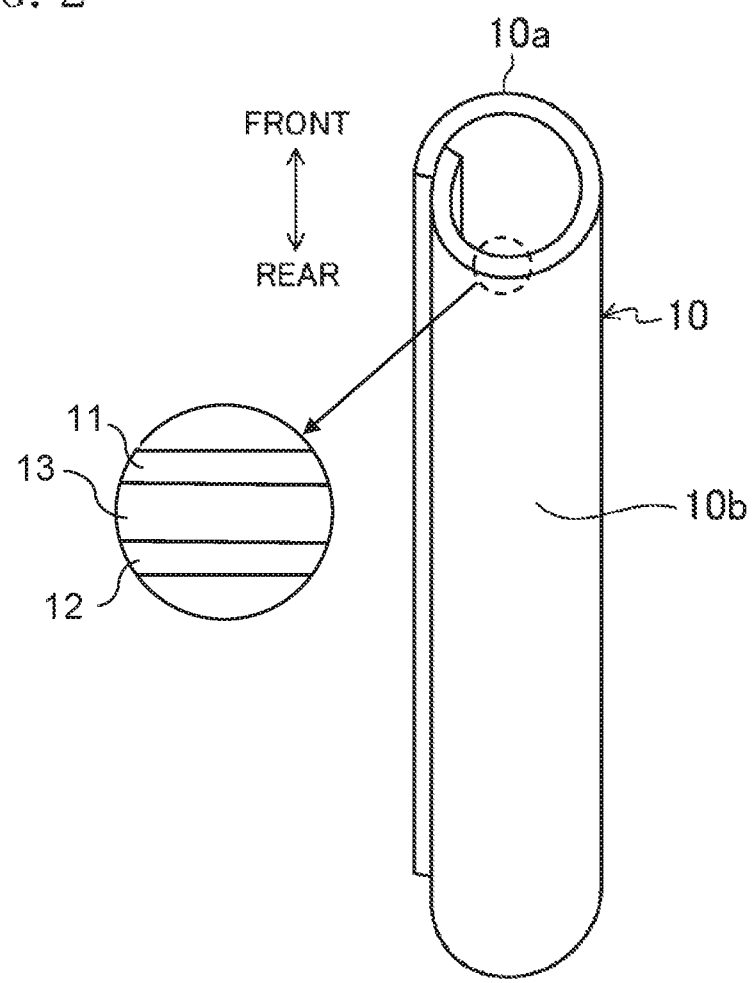
FIG. 2 is a perspective view illustrating a rear noise reduction member.

The rear noise reduction member 10 is made of a foamed material and arranged at the rear of the fender inner space R. Specifically, as shown in FIG. 2, the rear noise reduction member 10 has a vertically extending circular cylindrical shape, and has its vertical dimension set to be approximately equal to that of a rear portion of the fender inner space R. Also, the outside diameter of the rear noise reduction member 10 is set so as to close a backward opening at the rear of the fender inner space R from inside the fender inner space R.

The rear noise reduction member 10 may be made of any foamed material as long as it has some elasticity. For example, any of various types of rubber, a thermoplastic elastomer, or any other suitable material may be foamed by a known method and used as the foamed material. In this embodiment, the foamed material may be made of ethylene propylene diene rubber (EPDM). However, this is only an example and no way limiting. Examples of other suitable types of materials for the foamed material include chloroprene rubber (CR), styrene butadiene rubber (SBR), acrylonitrile butadiene rubber (NBR), and other types of synthetic rubber. Examples of the thermoplastic elastomers include thermoplastic olefin (TPO) elastomers and thermoplastic styrene (TPS) elastomers. Examples of the thermoplastic resins include polyethylene (PE), polypropylene (PP), and ethylene vinyl acetate (EVA) copolymer. The foamed material may consist essentially of only one of these raw materials or may also be any combination of a plurality of materials selected from the group mentioned above. Also, the foamed material suitably has a low specific gravity in order to make the noise reduction member a lightweight one.

The foamed material has a triple layer structure. That is to say, as shown in FIG. 2, the foamed material has a solid skin layer 11 on its surface (hereinafter referred to as a "surface skin layer"), a similar skin layer 12 on its back (hereinafter referred to as a "back skin layer"), and a foamed layer 13 between these two skin layers 11 and 12. The surface skin layer and the back skin layer have been formed to be thin enough to allow the foamed layer to retain sufficient sound absorbability. The surface and back skin layers may have the same thickness. Alternatively, one of these two layers may be thinner than the other. In addition, the surface and back skin layers are both solid layers with no foams, and therefore, have a cut-off property that substantially prevents water or any other liquid from transmitting through them from their surface to their back, or vice versa. On the other hand, the foams in the foamed layer may have a continuous foam structure in which the foams are continuous with each other, a semi-continuous foam structure in which some foams are continuous with each other but others are not, or an independent foam structure in which no foams are continuous with each other.

As shown in FIG. 2, the rear noise reduction member 10 may be obtained by rounding the foamed material that has been formed into a sheet shape into a cylindrical shape and joining both ends of the foamed material together. Both ends of the foamed material may be joined together in any of various manners, e.g., with a clip, a stapler, an adhesive, a double-sided tape, or a heat seal. Optionally, the foamed material may also be obtained by molding its raw material into such a cylindrical shape by extrusion molding process, for example. The thickness of the foamed material may be set to fall within the range of 10 mm to 30 mm, for example.

The rear noise reduction member 10 has an open top and an open bottom. This allows the noise in the fender inner space R to enter the rear noise reduction member 10 more easily. Alternatively, the rear noise reduction member 10 may be open at either the top or the bottom only. Optionally, a through hole may be cut through a part of the peripheral wall of the rear noise reduction member 10. This would also allow the noise in the fender inner space R to enter the rear noise reduction member 10 easily. Alternatively, removing the skin layer by cutting a non-through hole at a part of the rear noise reduction member 10 also allows the noise in the fender inner space R to enter the foamed layer inside the rear noise reduction member 10 easily, thus enhancing the sound absorption performance. The rear noise reduction member 10 is made of a foamed material with elasticity.

Thus, even after the fender panels 3 have already been assembled into the vehicle body, the rear noise reduction member 10 to be assembled can also be easily deformed and pushed into deep inside the fender inner space R, although the fender inner space R is so narrow that it is difficult for the worker to reach out for the deep region in such a situation. Also, pushing the rear noise reduction member 10 into deep inside the fender inner space R and then allowing the rear noise reduction member 10 to recover its original shape will make the rear noise reduction member 10 extend vertically in the deep region of the fender inner space R closer to the rear end of the vehicle as shown in FIG. 1, for example. Although not shown, the rear noise reduction member 10 may be secured with a clip or any other fastening member to an attachment hole cut through a flange in the fender inner space R, for example.

Note that the rear noise reduction member 10 may have a circular cylindrical shape or a polygonal cylindrical shape.

In a state where the rear noise reduction member 10 is arranged in the rear region of the fender inner space R closer to the rear end of the vehicle, the front and rear wall portions 10a and 10b of the peripheral wall portion of the cylindrical rear noise reduction member 10, which are located to interpose their center line between them, are arranged with some gap left between them in the vehicle longitudinal direction. In short, the front and rear wall portions 10a and 10b of the rear noise reduction member 10 are arranged to extend vertically and be spaced apart from each other in the longitudinal direction.

Each front-fender noise reduction member 20 is attached to a surface of its associated inner fender 6 facing the fender inner space R, i.e., the upper surface of the curved plate portion 6a of the inner fender 6. The front-fender noise reduction member 20 includes a body portion 21 made of the same foamed material as the rear noise reduction member 10, and a base portion 22 to which the body portion 21 is fixed. The base portion 22 may be configured as a thin plate or thin film made of polyethylene (PE), polypropylene (PP), polyethylene terephthalate (PET), or any other suitable material, for example. This base portion 22 has been formed to extend along, and be fixed to, the upper surface of the curved plate portion 6a of the inner fender 6. The base portion 22 may be fixed in any of various manners, e.g., with a clip, an adhesive, a double-sided tape, or a heat seal.

Figure 4:
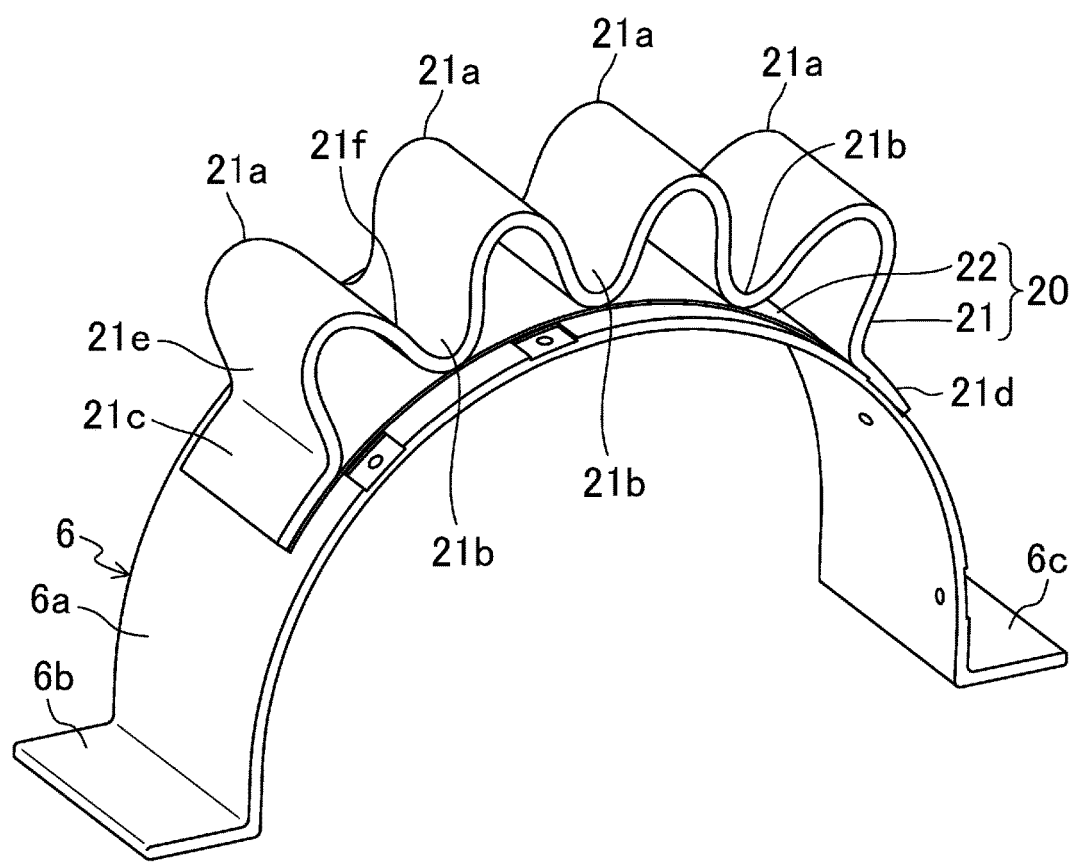
FIG. 4 is a perspective view of the inner fender including, as an attachment, the front-fender noise reduction member.
Figure 5:
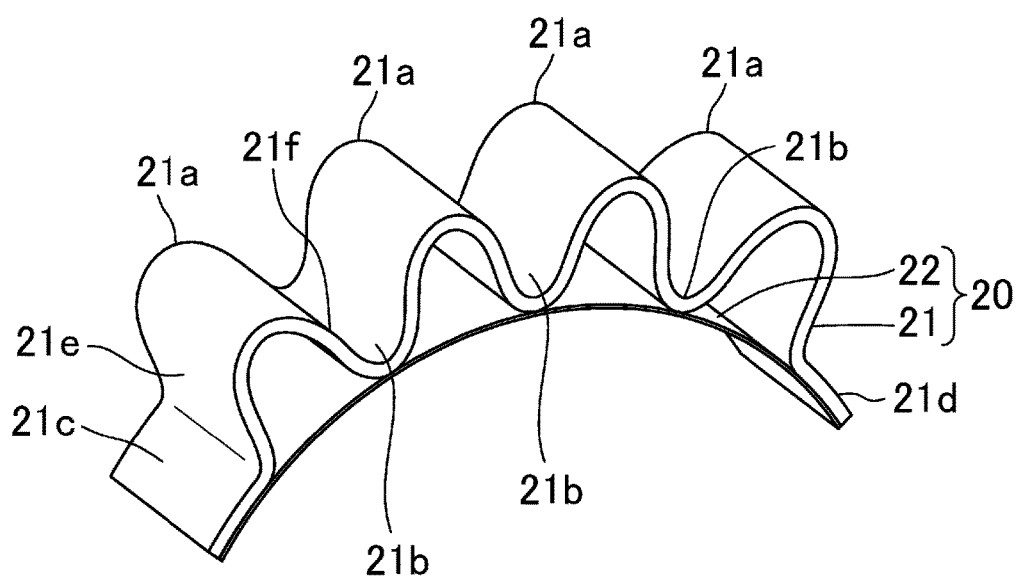
FIG. 5 is a perspective view of the front-fender noise reduction member.

As shown in FIGS. 3 and 4, the body portion 21 is formed by pleating the foamed material. Specifically, the body portion 21 includes a plurality of hollow protruding portions 21a, 21a, . . . formed to be arranged along the curved plate portion 6a of the inner fender 6, and a first fixing portion 21c and a second fixing portion 21d, which are arranged at both ends of the arrangement of the protruding portions 21a (i.e., at both ends thereof in the longitudinal direction). The protruding portions 21a, 21a, . . . can be formed easily by bending a plate foamed material into a shape in which crests and troughs alternate with each other.

The protruding portions 21a, 21a, . . . may all have the same protrusion height or have mutually different heights. In any case, their heights are suitably determined such that the tip of at least one of the protruding portions 21a abuts on the inner surface of the fender panel 3. This allows the noise that has come from outside of the vehicle cabin and entered the fender inner space R through a front portion thereof to strike the protruding portions 21a with reliability, and will not reach the rear region of the fender inner space R easily. Note that at least one protruding portion 21a needs to be provided. It is recommended, however, that a plurality of protruding portions 21a be provided as illustrated on the drawings.

Also, each protruding portion 21a includes two wall portions (hereinafter referred to as a "first wall portion 21e" and a "second wall portion 21f," respectively) which are arranged to be spaced apart from each other in the longitudinal direction. These wall portions 21e and 21f protrude from the inner fender 6 in the fender inner space R, and have been formed to come closer to each other toward the tip end in their protrusion direction. In other words, the space between the wall portions 21e and 21f becomes narrower toward the tip end in their protrusion direction.

The first and second fixing portions 21c and 21d are in the shape of a plate extending along the base portion 22 and are fixed to the base portion 22. Also, the portion between each adjacent pair of protruding portions 21a, 21a serves as an intermediate fixing portion 21b. This intermediate fixing portion 21b is fixed to the base portion 22.

(Advantages of First Embodiment)

As can be seen from the foregoing description, according to the first embodiment, the wall portions 21e, 21f, forming the protruding portion 21a of the front-fender noise reduction member 20, define a multi-wall structure by extending in the fender inner space R in such a direction as to protrude from the curved plate portion 6a of the inner fender 6. This substantially reduces the noise that has entered the fender inner space R through the frontend and that eventually leaks out of the space R through the rear end, thus enhancing sound insulation effects. In addition, the noise reduction member has a lightweight structure, and the noise in the fender inner space R is absorbed into both of the wall portions 21e, 21f, because the wall portions 21e, 21f are made of a foamed material. This ensures a broad sound absorption area and enhances the sound absorption performance.

Furthermore, the front and rear wall portions 10a, 10b of the rear noise reduction member 10 arranged in the rear region of the fender inner space R extend vertically in the fender inner space R, thus further reducing the noise leaking out of the fender inner space R backward, i.e., toward the motor vehicle entrances. In this case, the front and rear wall portions 10a, 10b are spaced apart from each other in the longitudinal direction to define the multi-wall structure. Therefore, the noise in the fender inner space R is once shut off by the front wall portion 10a and then further shut off by the rear wall portion 10b, thus enhancing the sound insulation effect. In addition, the noise reduction member has a lightweight structure, and the noise in the fender inner space R is absorbed into both of the front and rear wall portions 10a, 10b, because the front and rear wall portions 10a, 10b are—spaced apart from each other in the longitudinal direction and made of a foamed material. This ensures a broad sound absorption area and enhances the sound absorption performance. This further improves the quietness in the vehicle cabin while reducing an increase in the weight of the motor vehicle.

Furthermore, rain water, carwash water, or any other kind of water sometimes externally enters the fender inner space R and is sometimes deposited on the front-fender noise reduction member 20. The surface of the foamed material, making up the front-fender noise reduction member 20, is coated with a solid skin layer. Thus, the solid skin layer functions as a sound insulation wall. Furthermore, the solid skin layer coating the surface of the foamed material substantially prevents the water deposited on the wall portions 21e and 21f from permeating, thus curbing a decline in sound insulation and sound absorption performances. As a result, the quietness can be kept high for a long time.

In addition, the rear noise reduction member 10 having a cylindrical shape can be manufactured more easily, because its shape is simplified. Furthermore, the cylindrical shape of the rear noise reduction member 10 allows parts of the peripheral wall portions, which are located to interpose the centerline between them, to be spaced apart from each other, thus easily obtaining front and rear wall portions 10a and 10b which are spaced apart from each other.

Besides, the rear noise reduction member 10, having an open top and an open bottom, allows the noise in the fender inner space R to enter the rear noise reduction member 10 and be absorbed into the front and rear wall portions 10a and 10b effectively.

(Test Results)

The present inventors carried out a test to compare the degree of quietness of a motor vehicle equipped with the front-fender noise reduction members 20 and rear noise reduction members 10 of the first embodiment with that of a motor vehicle equipped with front-fender and inner-noise reduction members configured as urethane molded blocks. The results are as follows. The motor vehicle subjected to this test was a standard-sized automobile. A loudspeaker S was arranged behind and adjacent to one of the front wheels of a stopped motor vehicle as shown in FIG. 1 to upwardly emit a sound at a frequency of 250 Hz to 5,000 Hz and at an output sound pressure level of 100 dB, thereby reproducing a simulated road noise. In the vehicle cabin, the sound pressure level was measured at one of the front seat occupant's ears, where a microphone M was set up. As a result, the sound pressure level of the motor vehicle equipped with the front-fender noise reduction members 20 and rear noise reduction members 10 decreased particularly significantly in a frequency range of 500 Hz to 2,000 Hz compared with the motor vehicle equipped with noise reduction member configured as urethane molded blocks. For example, the sound pressure level decreased by about 1.5 dB in the vicinity of 600 Hz, and decreased by about 2.1 dB in the vicinity of 1,250 Hz. In addition, even in the vicinity of 3,200 Hz, the sound pressure level of the motor vehicle equipped with the front-fender noise reduction members 20 and rear noise reduction members 10 was the lower than, and decreased by about 1.7 dB compared with, a motor vehicle equipped with neither of these two types of noise reduction members.

(Variations of First Embodiment)

Figure 6:
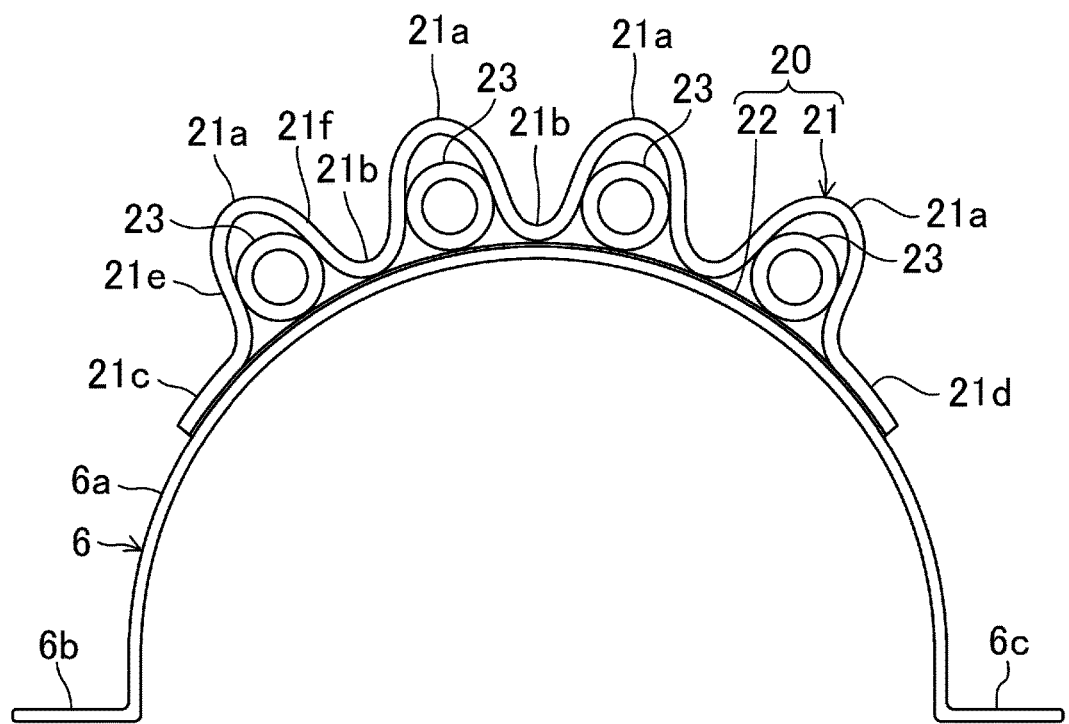
FIG. 6 is a view corresponding to FIG. 3 and illustrating a first variation of the first embodiment.

FIG. 6 illustrates a first variation of the first embodiment. As shown in FIG. 6, a sound absorbing material 23 may be inserted into each protruding portion 21a of the front-fender noise reduction member 20. The sound absorbing material 23 may be made of either the same foamed material as the rear noise reduction member 10 or fibers. Inserting the sound absorbing material 23 into each protruding portion 21a further enhances the sound absorption performance and reduces the collapse of the protruding portion 21a.

Figure 7:
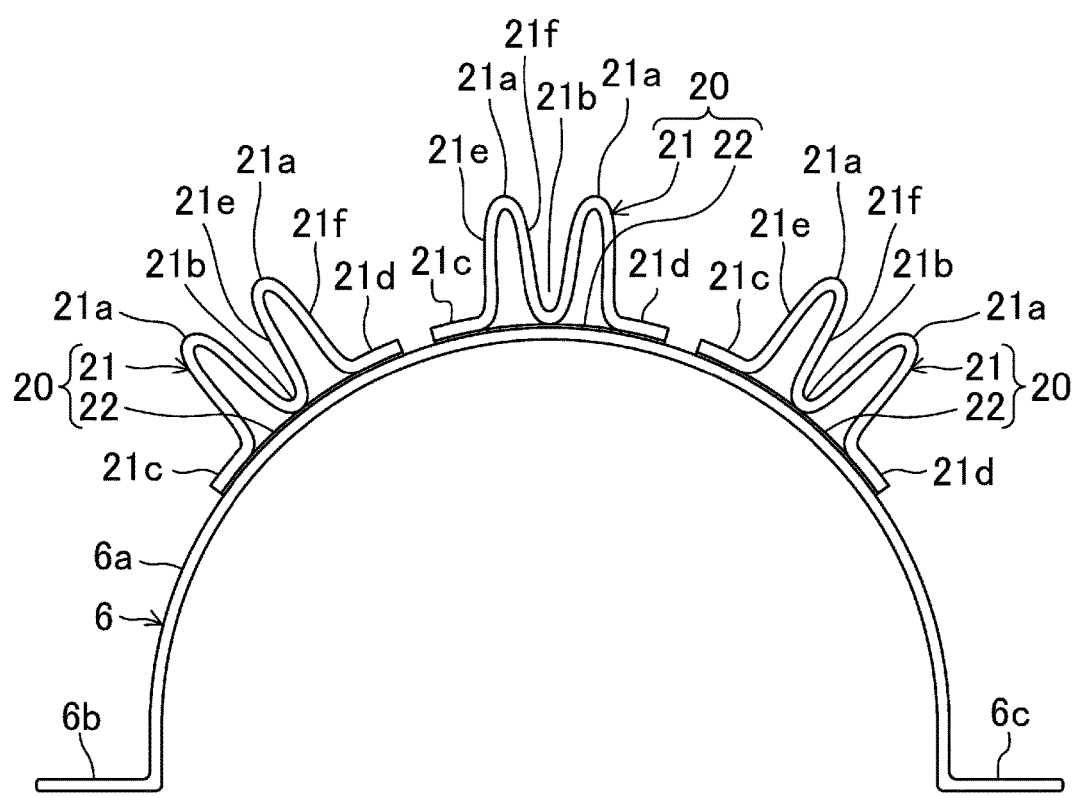
FIG. 7 is a view corresponding to FIG. 3 and illustrating a second variation of the first embodiment.

FIG. 7 illustrates a second variation of the first embodiment. As shown in FIG. 7, a plurality of front-fender noise reduction members 20, 20, 20 may be arranged to be spaced apart from each other in the direction in which the curved plate portion 6a of the inner fender 6 extends. In that case, the front-fender noise reduction members 20 may be arranged efficiently only in regions of the curved plate portion 6a of the inner fender 6 with high sound absorption and/or sound insulation effects.

Figure 8:
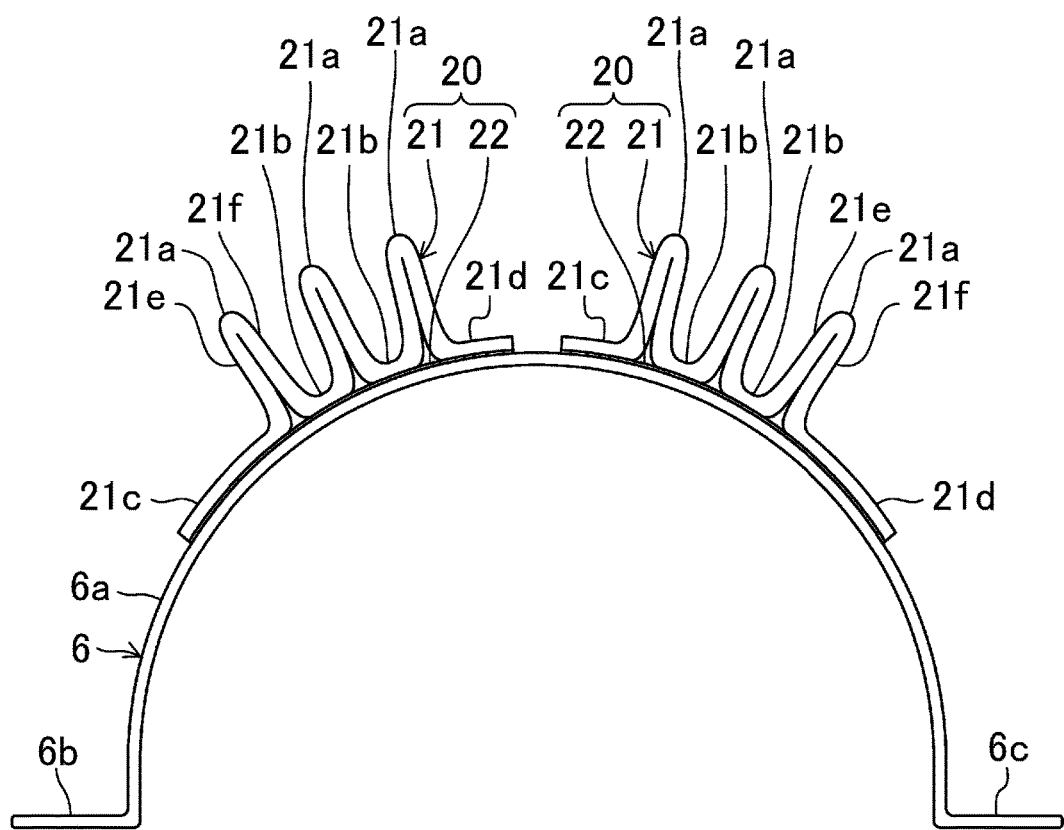
FIG. 8 is a view corresponding to FIG. 3 and illustrating a third variation of the first embodiment.

FIG. 8 illustrates a third variation of the first embodiment. As shown in FIG. 8, each protruding portion 21a of the corresponding front-fender noise reduction member 20 may have a narrower gap. In that case, wall portions forming respective parts of adjacent protruding portions 21a, 21a will be arranged to be spaced apart from each other. In this third variation, a plurality of front-fender noise reduction members 20 may be provided as in the second variation.

(Second Embodiment)

Figure 9:
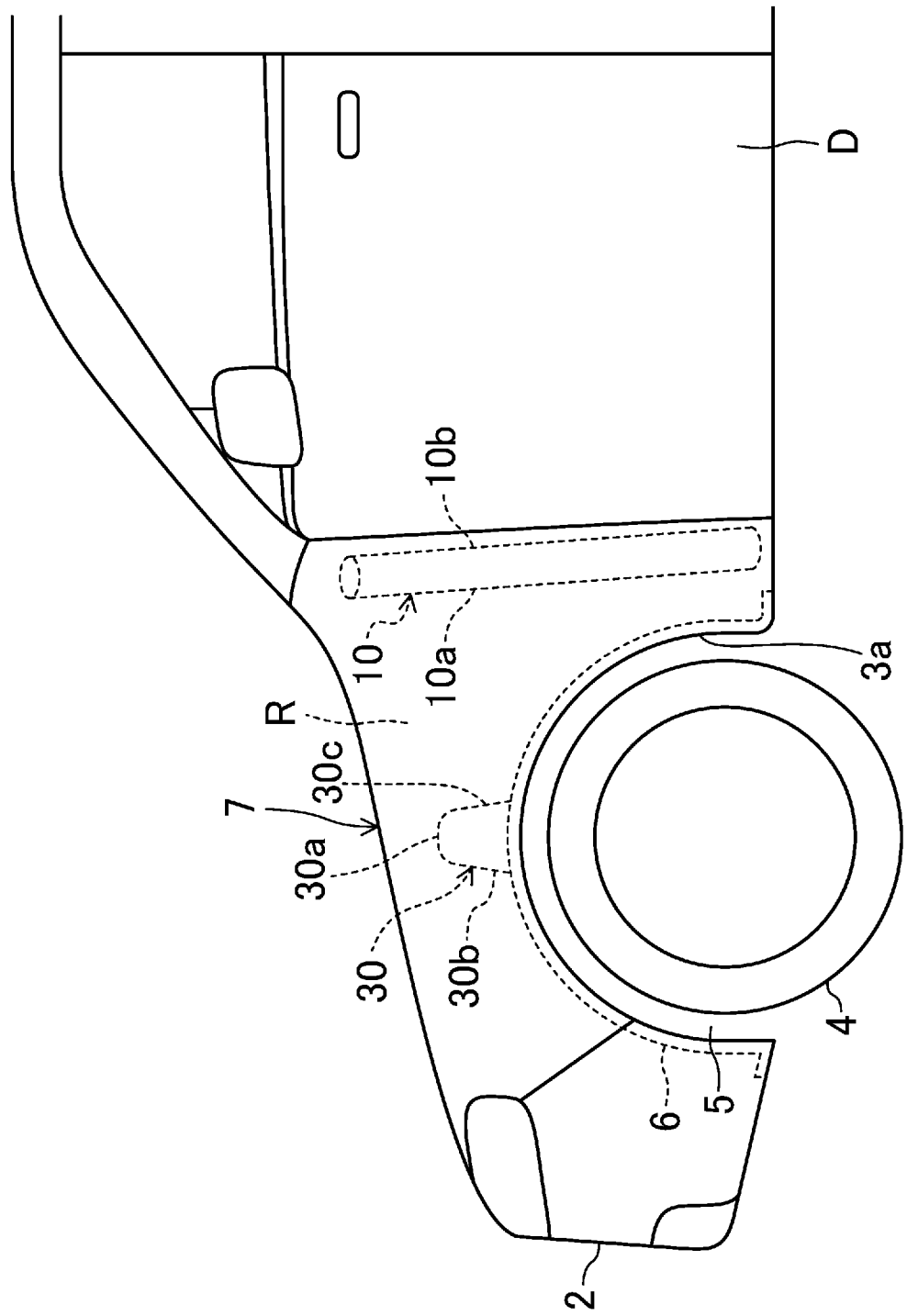
FIG. 9 is a view corresponding to FIG. 1 and illustrating a second embodiment.
Figure 10:
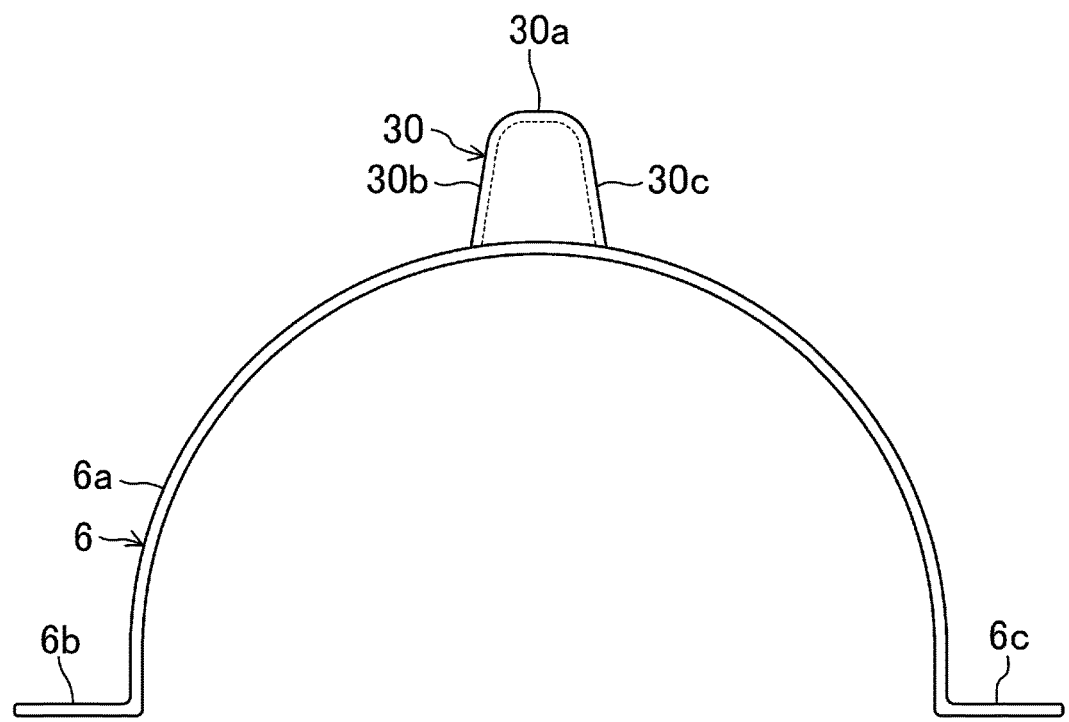
FIG. 10 is a view corresponding to FIG. 3 and illustrating the second embodiment.
Figure 11:
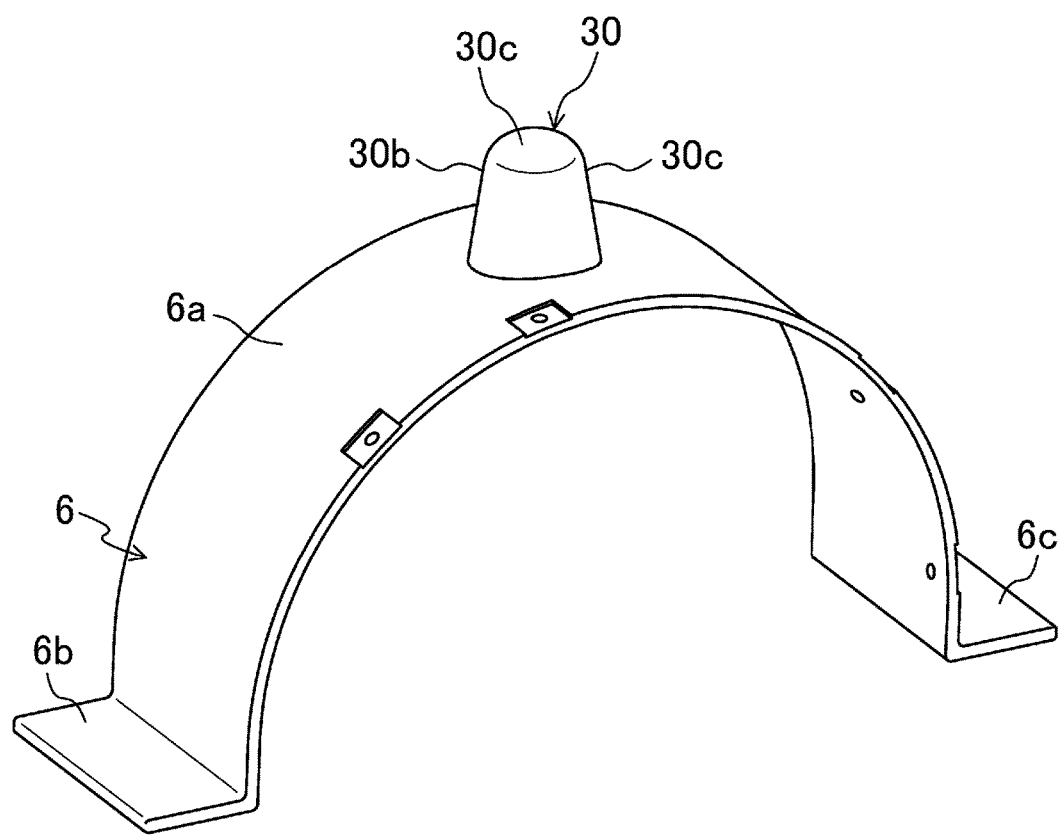
FIG. 11 is a view corresponding to FIG. 4 and illustrating the second embodiment.

FIGS. 9-11 illustrate a second embodiment of the present disclosure. The second embodiment is the same as the first embodiment described above except the structure of the front-fender noise reduction member. Thus, any member of the second embodiment having substantially the same function as its counterpart of the first embodiment described above will be designated by the same reference numeral as the counterpart's and will not be described all over again to avoid redundancies. Instead, the following description of the second embodiment will be focused on only the differences from the first embodiment.

Specifically, a front-fender noise reduction member 30 according to the second embodiment is fixed to the upper surface of the curved plate portion 6a of an associated inner fender 6, has a cylindrical shape upwardly protruding from the upper surface, and has its top end closed with a closing portion 30a. The front-fender noise reduction member 30, having such a cylindrical shape, allows the front and rear wall portions 30b and 30c of the peripheral wall portion thereof, which are located to interpose their center line between them, to be arranged with some gap left between them in the vehicle longitudinal direction. The front and rear wall portions 30b and 30c will be hereinafter referred to as a "first wall portion 30b" and a "second wall portion 30c," respectively. The front-fender noise reduction member 30 may house a sound absorption member made of fibers (not shown) inside. The top end of the front-fender noise reduction member 30 is suitably arranged to abut on the inner surface of the fender panel 3.

This second embodiment also achieves the same advantages as the first embodiment described above. In addition, forming the front-fender noise reduction member 30 in such a simplified shape can cut down the manufacturing cost.

(Test Results)

The present inventors carried out a test to compare the quietness of a motor vehicle equipped with the front-fender noise reduction members 30 and rear noise reduction members 10 of the second embodiment with that of a motor vehicle equipped with front-fender and inner-noise reduction members configured as urethane molded blocks. The results are as follows. The test was carried out just as described above, and description of the testing method will be omitted herein.

As a result, the motor vehicle equipped with the front-fender noise reduction members 30 and the inner-noise reduction members 20 achieved almost the same sound pressure level as the first embodiment in almost the entire frequency range. In this case, the noise reduction member of the second embodiment had a total weight of 77 g, and the urethane molded blocks as a comparative example had a total weight of 213 g. Thus, this second embodiment achieves significant weight reduction.

(Third Embodiment)

Figure 12:
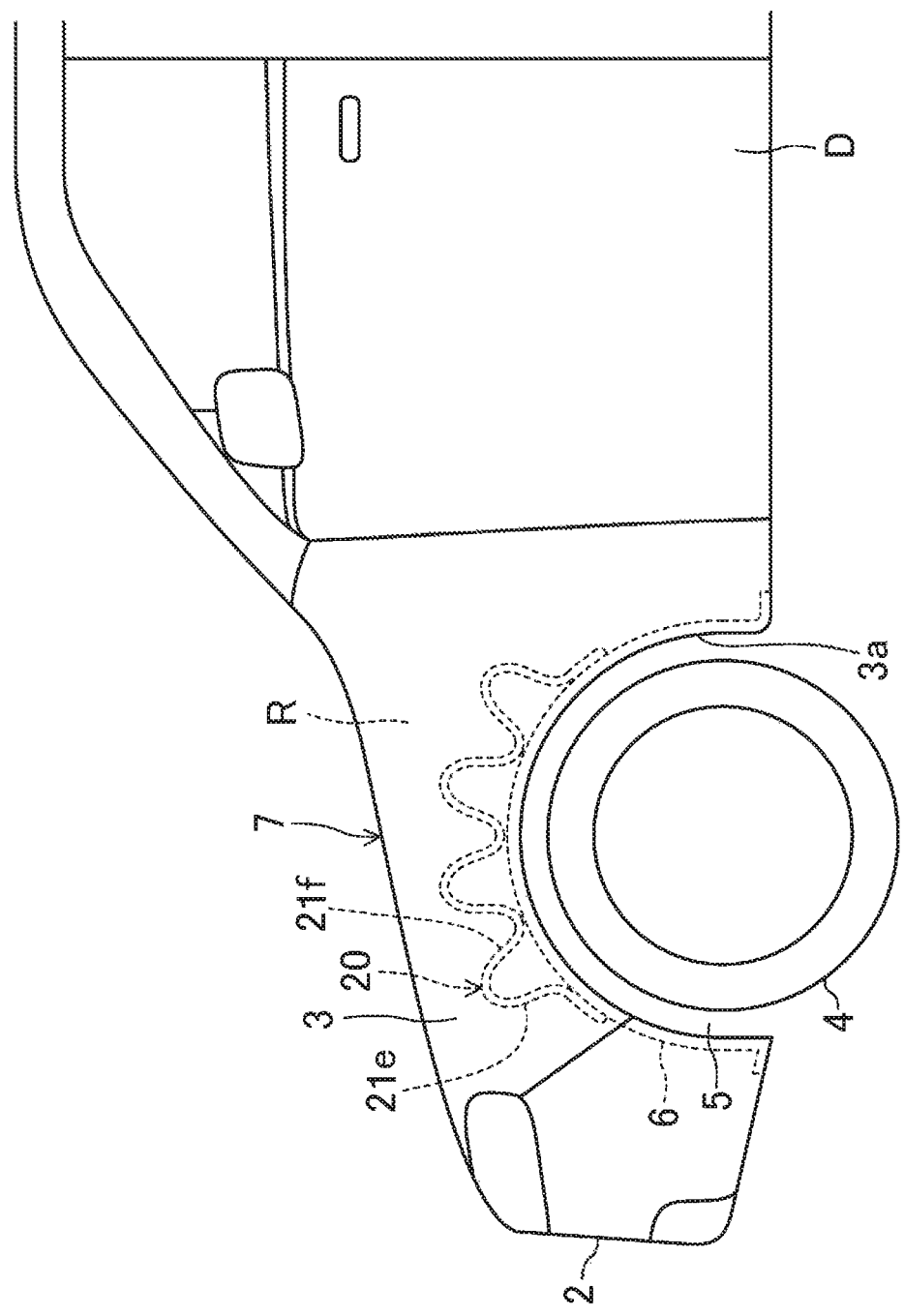
FIG. 12 is a view corresponding to FIG. 1 and illustrating a third embodiment.

FIG. 12 illustrates a third embodiment of the present disclosure. The third embodiment is the same as the first embodiment described above except that the third embodiment does not include the rear noise reduction member 10. Thus, any member of the third embodiment having substantially the same function as its counterpart of the first embodiment described above will be designated by the same reference numeral as the counterpart's and will not be described all over again to avoid redundancies. This third embodiment, also including the front-fender noise reduction members 20, can also achieve the same advantages as the first embodiment described above.

(Fourth Embodiment)

Figure 13:
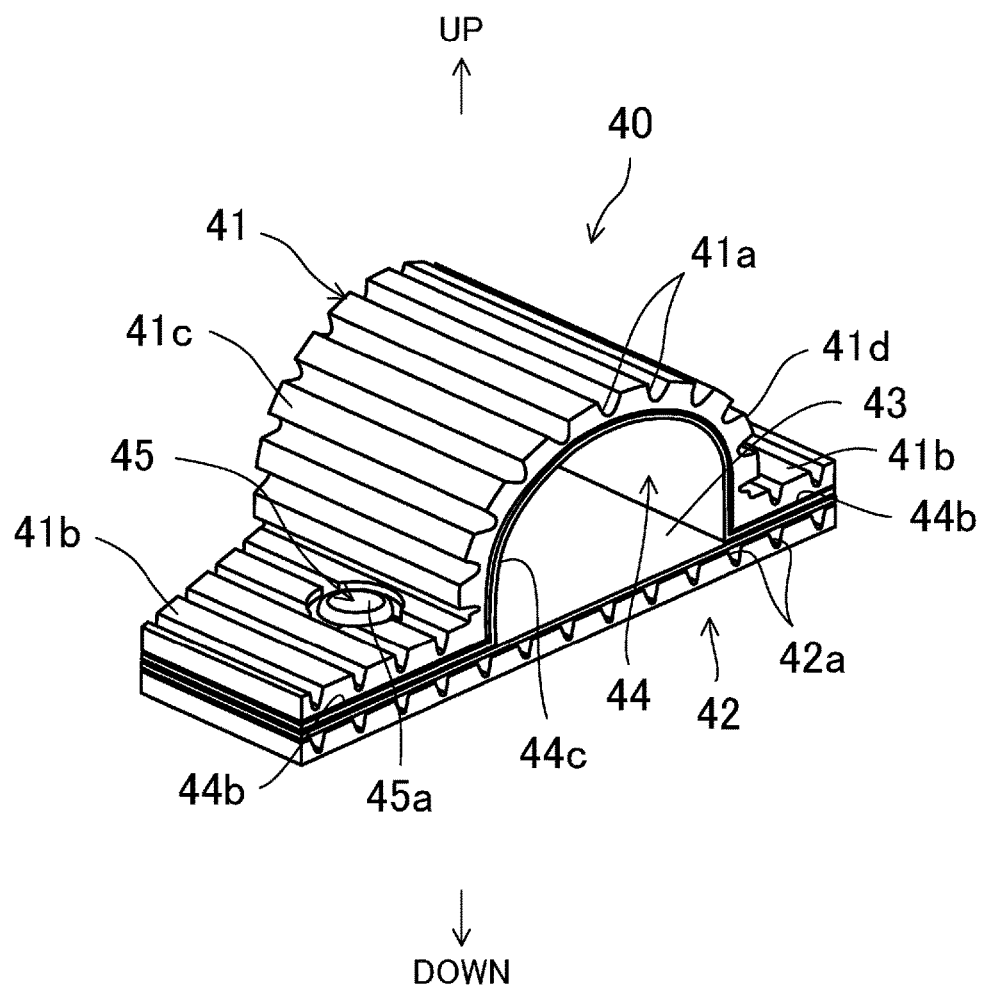
FIG. 13 is a perspective view illustrating a front-fender noise reduction member according to a fourth embodiment.

FIG. 13 illustrates a fourth embodiment of the present disclosure. A front-fender noise reduction member 40 according to this fourth embodiment is comprised of a different number of constituents of a different type and different shape and with a different arrangement, compared to its counterpart of the first embodiment described above. The configuration of this fourth embodiment will be described in detail below.

The front-fender noise reduction member 40 according to this fourth embodiment includes: a body portion (plate member) 41; a base portion (plate member) 42 to which the body portion 41 is fixed; a first plate member 43 and a second plate member 44 interposed between the body portion 41 and the base portion 42; and a plurality of clips (coupling members) 45. The body portion 41 and the base portion 42 are made of the same material as the rear noise reduction member 10 of the first embodiment. On the other hand, the first and second plate members 43 and 44 are made of the same material as the base portion 22 of the front-fender noise reduction member 20 of the first embodiment, and are configured as hard plate members made of a harder material than the wall portions 21e and 21f of the first embodiment. Also, the clips 45 are provided to couple and combine together the base portion 42, the first and second plate members 43, 44, and the body portion 41, and may be configured as resin clips which have been known in the art.

Figure 14:
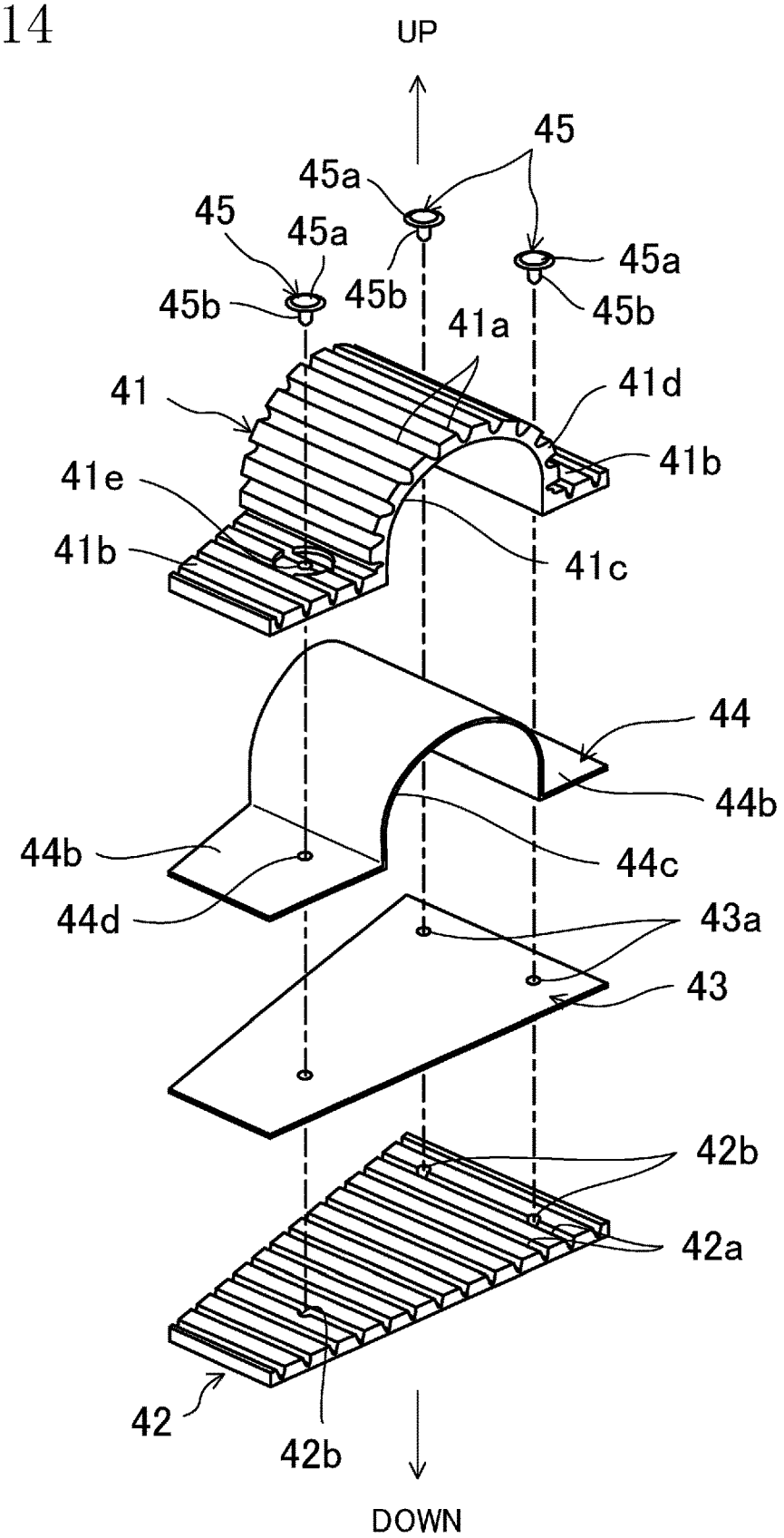
FIG. 14 is an exploded perspective view illustrating a front-fender noise reduction member according to the fourth embodiment.
Figure 15:
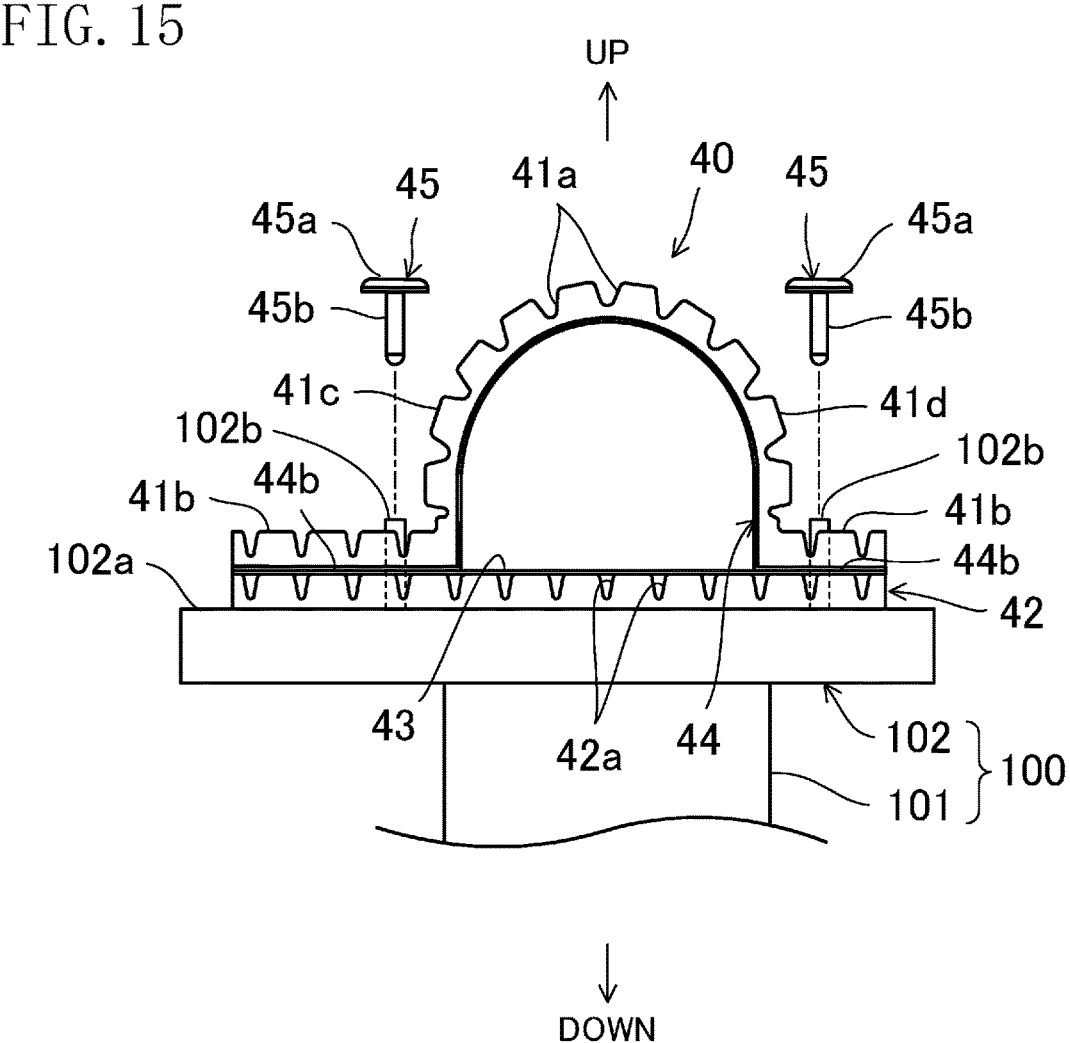
FIG. 15 is a side view illustrating how to assemble the front-fender noise reduction member according to the fourth embodiment.

In the following description of the fourth embodiment, the "upside" and "downside" of the front-fender noise reduction member 40 will be defined as shown in FIGS. 13-15. However, this definition is adopted just for the sake of convenience, and this orientation does not have to agree with that of the noise reduction member 40 actually mounted for use on the vehicle. That is to say, the noise reduction member 40 may be used, regardless of which side is up.

As shown in FIG. 14, the base portion 42 has been formed to have a generally flat plate shape while no external force is applied thereto. The base portion 42 may also have a rectangular shape, an elliptical shape, or an oval shape as well. On the upper surface of the base portion 42, a plurality of grooves 42a have been cut to extend parallel to each other. Alternatively, the grooves 42a may be cut on the lower surface of the base portion 42 instead. The base portion 42 has clip insert holes 42b, to which clips 45 are inserted, at both ends thereof in the longitudinal direction. Optionally, the grooves 42a may be omitted. Nevertheless, cutting the grooves 42a makes it easier to handle this noise reduction member 40 (e.g., facilitates stacking the first plate member 43 on the base portion 42).

On the upper surface of the body portion 41, a plurality of grooves 41a, similar to the grooves 42a of the base portion 42, have been cut to extend parallel to each other. Alternatively, the grooves 41a may be cut on the lower surface of the body portion 41 instead. Optionally, the grooves 41a may be omitted. Nevertheless, cutting the grooves 41a makes it easier to handle this noise reduction member 40 (e.g., facilitates stacking the body member 41 on the second plate member 44). In this embodiment, the body portion 41 is supposed to be almost as thick as the base portion 42. Alternatively, one of these two portions 41, 42 may be thicker than the other. Also, the body portion 41 includes side plate portions 41b, 41b, which are provided to extend along the upper surface of the base portion 42 and face both ends of the base portion 42 in the longitudinal direction thereof, and to be spaced apart from each other in the longitudinal direction of the base portion 42. The body portion 41 further includes a first wall portion 41c formed to upwardly protrude from one side plate portion 41b and a second wall portion 41d formed to upwardly protrude from the other side plate portion 41b. The respective base ends of the first and second wall portions 41c and 41d are arranged to be spaced apart from each other. The first and second wall portions 41c and 41d are formed to come closer to each other toward the tip end in their protruding direction. In other words, the space between the first and second wall portions 41c and 41d becomes narrower toward the tip end in their protruding direction. The side plate portions 41b have clip insert holes 41e to receive clips 45 and to face their associated clip insert holes 42b of the base portion 42.

The first plate member 43 is arranged on the upper surface of the base portion 42 and configured as a flat plate member extending along that upper surface. The first plate member 43 has the same contour as the base portion 42. The thickness of the first plate member 43 is set to be smaller than that of the base portion 42. The first plate member 43 has clip insert holes 43a to receive the clips 45 and to face their associated clip insert holes 42b of the base portion 42.

The second plate member 44 is arranged between the body portion 41 and the first plate member 43. Also, the second plate member 44 includes flat plate portions 44b, 44b, which are provided to extend along the lower surface of the side plate portions 41b, 41b of the body portion 41 and face both ends of the base portion 42 in the longitudinal direction thereof, and to be spaced apart from each other in the longitudinal direction of the base portion 42. Furthermore, a portion 44c of the second plate member 44 between the flat plate portions 44b, 44b is upwardly curved to extend along the first and second wall portions 41c and 41d of the body portion 41. The second plate member 44 can prevent the first and second wall portions 41c, 41d of the body portion 41 from being deformed excessively by supporting the first and second wall portions 41c and 41d from under them. The side plate portions 44b have clip insert holes 44d to receive the clips 45 and to face their associated clip insert holes 42b of the base portion 42.

The first plate member 43 and the second plate member 44 are made of a harder material than the base portion 42 and the body portion 41 are. This allows the first and second plate members 43 and 44 to maintain the shapes of the base portion 42 and the body portion 41. Among other things, this allows the shapes of the first and second wall portions 41c and 41d of the body portion 41 to be maintained for a long time, thus achieving high sound absorption performance.

The clips 45 each include a disklike head portion 45a and a shaft portion (insert portion) 45b downwardly protruding from the center of the lower surface of the head portion 45a. The shaft portion 45b of each clip 45 is inserted from over the body portion 41 into its associated clip insert holes 41e, 44d, 43a, and 42b of the body portion 41, the second plate member 44, the first plate member 43, and the base portion 42 in this order. The length of each shaft portion 45b is determined such that the tip end of the shaft portion 45b in its protruding direction protrudes downward through its associated clip insert hole 42b of the base portion 42.

Also, it is recommended that the tip end of each shaft portion 45b have a claw (not shown), which may be configured as a radially protruding projection. Such a claw can be engaged with a peripheral edge portion of the clip insert hole 42b on the lower surface of the base portion 42 after the shaft portion 45b has been inserted into the respective clip insert holes 41e, 44d, 43a, and 42b. This allows the respective head portions 45a and claws of the clips 45 to sandwich the base portion 42, the first plate member 43, the second plate member 44, and the body portion 41 in their thickness direction and combine them together. Note that the base portion 42, the first plate member 43, the second plate member 44, and the body portion 41 may be joined together in any of various manners, e.g., with a stapler, a double-sided tape, an adhesive, a heat seal, or any other fixing means, or with a different type of clips as well.

An assembling jig 100 such as the one shown in FIG. 15 may be used to assemble the base portion 42, the first plate member 43, the second plate member 44, and the body portion 41 together. The assembling jig 100 includes a base portion 101 and a flat plate portion 102 provided at the top end of the base portion 101. On the upper surface 102a of the flat plate portion 102, positioning members 102b for positioning the base portion 42, the first plate member 43, the second plate member 44, and the body portion 41 are arranged to protrude upward.

First of all, the base portion 42 is put on the upper surface 102a of the flat plate portion 102, and then the first plate member 43, the second plate member 44, and the body portion 41 are stacked thereon one upon the other in this order. In the meantime, the positioning members 102b are used to determine the relative positions of the base portion 42, the first plate member 43, the second plate member 44, and the body portion 41. Thereafter, the clips 45 are held over the body portion 41 and then have their respective shaft portions 45b inserted into the clip insert holes 41e, 44d, 43a, and 42b. Allowing the tip end of each shaft portion 45b to protrude downward from its associated clip insert hole 42b of the base portion 42 will bring the claw into engagement with the peripheral edge portion of the clip insert hole 42b on the lower surface of the base portion 42. In this manner, the front-fender noise reduction member 40 such as the one shown in FIG. 13 is obtained.

Figure 16:
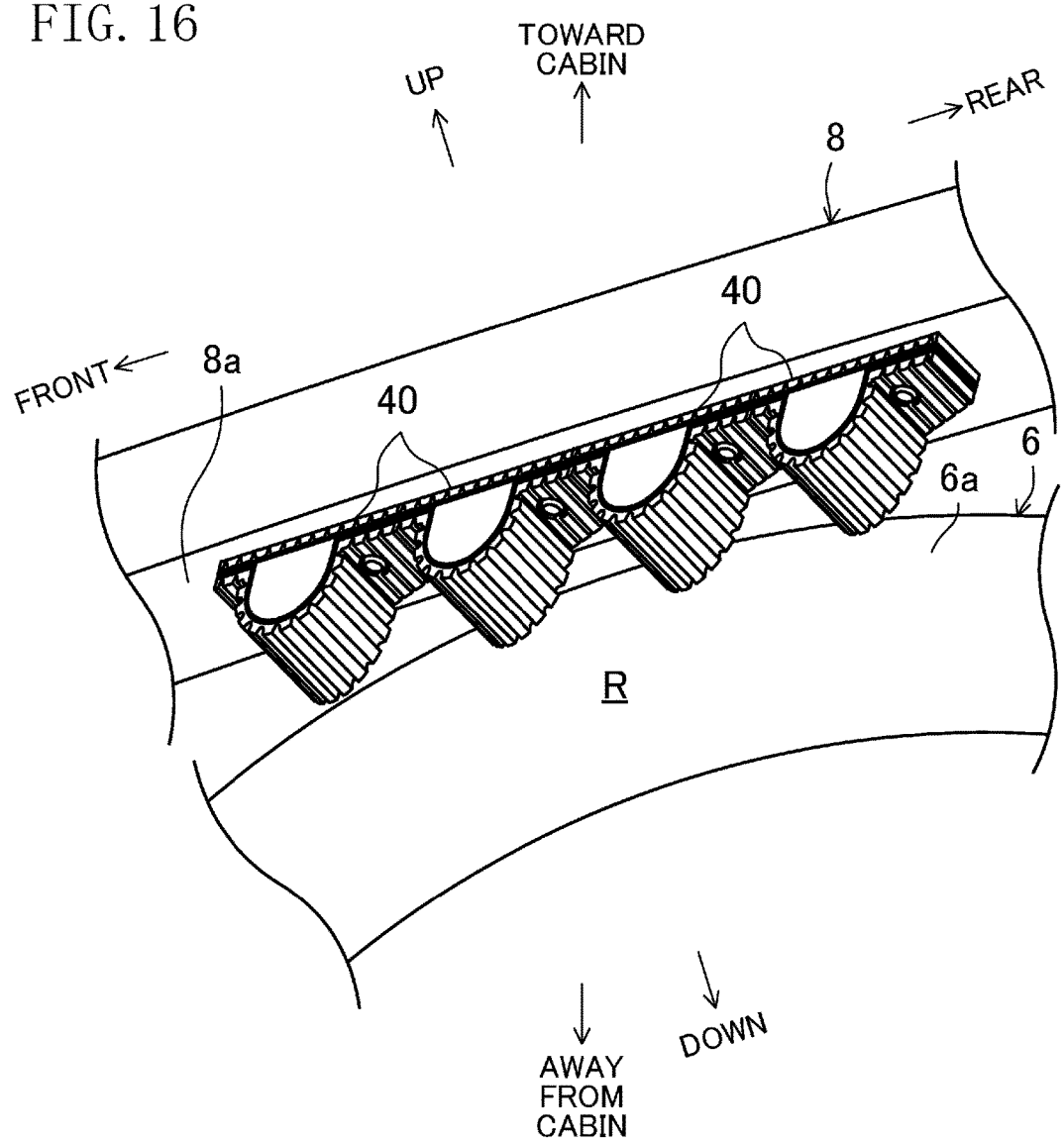
FIG. 16 is a perspective view of the inside of a front fender illustrating how to attach the front-fender noise reduction member according to the fourth embodiment.

The front-fender noise reduction member 40 with such a configuration is arranged in the fender inner space R as shown in FIG. 16. FIG. 16 is a perspective view of the fender inner space R as viewed from outside and over the vehicle with the fender panel 3 omitted. The reference numeral 8 denotes a front side frame extending in the vehicle's longitudinal direction. The front side frame 8 is a member located in the fender inner space R and forming part of the vehicle body of the motor vehicle 1.

A side surface 8a of the front side frame 8, facing outside of the vehicle (hereinafter referred to as an "external side surface"), is a surface facing the fender inner space R. Also, an inner fender 6 is arranged below, and outwardly of, the front side frame 8. The external side surface 8a of the front side frame 8 is located above the curved plate portion 6a of the inner fender 6. The front-fender noise reduction member 40 is attached to the external side surface 8a of the front side frame 8.

That is to say, the base portion 42 of the front-fender noise reduction member 40 is fixed onto the external side surface 8a of the front side frame 8. In this state, the first and second wall portions 41c and 41d of the body portion 41 protrude from the external side surface 8a into the fender inner space R. The tip end of the first and second wall portions 41c and 41d of the body portion 41 in their protruding direction is suitably brought into contact with the inner surface of the fender panel 3. A plurality of front-fender noise reduction members 40 may be fixed on the external side surface 8a of the front side frame 8 as illustrated in FIG. 16. However, this is only an example. Alternatively, only one front-fender noise reduction member 40 could be fixed there instead.

The front-fender noise reduction member 40 may be fixed on the external side surface 8a of the front side frame 8 with the clips 45. In that case, plug holes (not shown) to which the respective shaft portions 45a of the clips 45 can be plugged are cut through the external side surface 8a of the front side frame 8 and the shaft portions 45a are plugged into those plug holes such that the claws are engaged with the peripheral edge portions of the plug holes. This allows the front-fender noise reduction member 40 to be fixed onto the front side frame 8 with the clips 45 for combining the base portion 42, the first plate member 43, the second plate member 44, and the body portion 41 together without providing any additional member for fixing the front-fender noise reduction member 40, thus cutting down the number of parts required.

Figure 17:
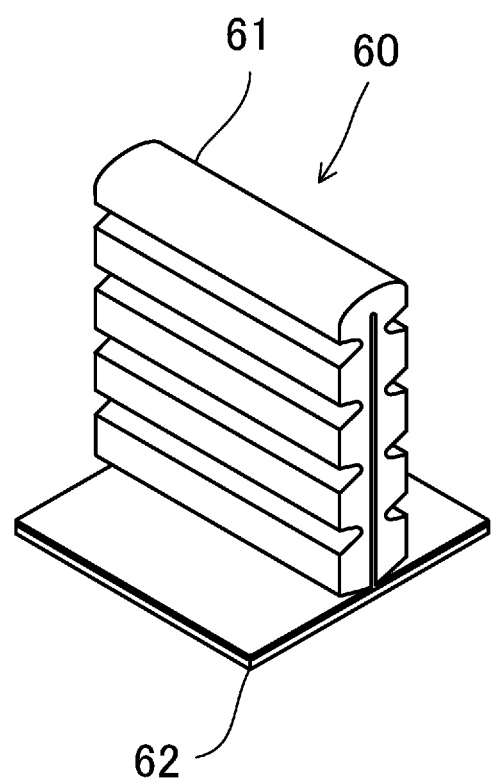
FIG. 17 is a view corresponding to FIG. 13 and illustrating a first comparative example.
Figure 18:
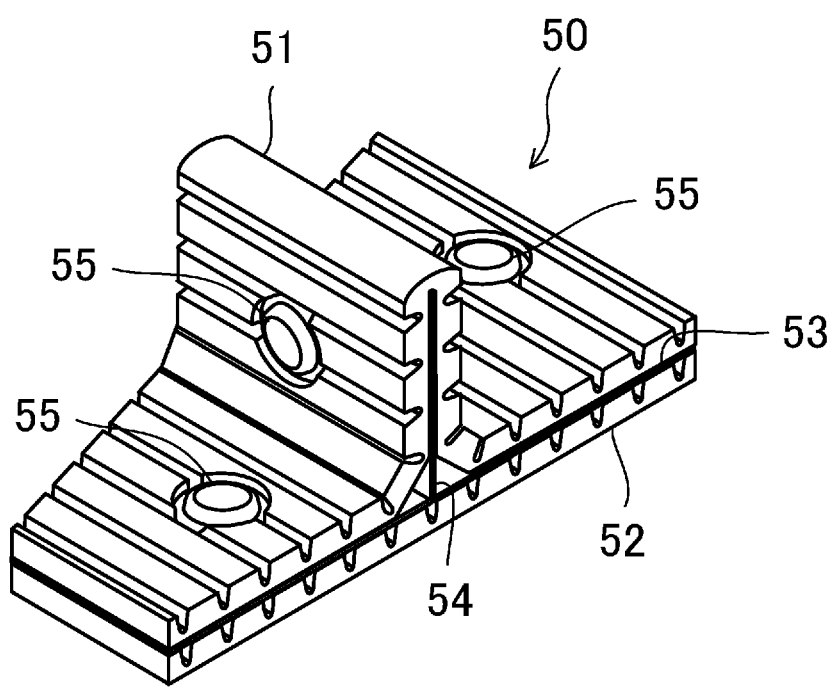
FIG. 18 is a view corresponding to FIG. 13 and illustrating a second comparative example.

Next, a difference in sound absorption performance between an example of the fourth embodiment, a first comparative example illustrated in FIG. 17, and a second comparative example illustrated in FIG. 18 will be described. The example is the one illustrated in FIG. 13. The first comparative example is the front-fender noise reduction member 60 illustrated in FIG. 17, which includes a body portion 61 with a dual stacked structure made of the same material as the body portion 41 of the example, and an attachment plate portion 62 configured as a hard resin plate. The second comparative example is the front-fender noise reduction member 50 shown in FIG. 18, which includes a body portion 51 with a dual stacked structure made of the same material as the body portion 41 of theexample, a base portion 52, a first plate member 53 interposed between the body portion 51 and the base portion 52, and a second plate member 54 arranged inside the body portion 51. The body portion 51, the base portion 52, the first plate member 53, and the second plate member 54 are combined together with clips 55. The first and second comparative examples are each attached to the front side frame 8 as shown in FIG. 16.

The sound pressure levels at one of the ears of a front seat occupant were measured by the testing method described for the first embodiment with respect to the example and the first and second comparative examples. As a result, the example continuously caused a decrease in sound pressure level at a frequency of 1,600 Hz or more, with respect to the first and second comparative examples. Specifically, the sound pressure level decreased by about 2.5 dB at maximum in the frequency range of 1,600 Hz to 5,000 Hz. Also, in the example, the sound pressure level decreased by about 1 dB at maximum in the frequency range of around 700 Hz to 1,300 Hz, with respect to the first and second comparative examples.

Although not shown, in the fourth embodiment, the front-fender noise reduction member 40 may be attached to the inner fender 6 as in the first to third embodiments. Also, in the first to third embodiments, the front-fender noise reduction member may be attached to the front side frame as in the fourth embodiment.

Even though the first to fourth embodiments of the present disclosure have been described as being applied to the front fenders, the present disclosure is applicable to rear fenders as well, although not shown. When applied to any of the rear fenders, the present disclosure will be implemented as a rear-fender noise reduction member, which can substantially prevent various kinds of noise from entering the vehicle cabin from the rear of the vehicle body. Even so, the same advantages will also be achieved as in a situation where the present disclosure is applied to the front fender. In that case, the shape of the rear-fender noise reduction member may be determined to match the structure and shape of the rear fender.

Note that each and every embodiment described above is just an example in any respect and should not be construed to be a limiting one. Besides, any variations or modifications falling within the range of equivalents to the claims to be described below are all encompassed within the scope of the present disclosure.

As can be seen from the foregoing description, a noise reduction member according to the present disclosure may be arranged in a fender inner space defined between a fender panel functioning as a front exterior panel for a motor vehicle, for example, and an inner fender forming a front wheelhouse.

What is claimed is:

1. A noise reduction member for a motor vehicle fender, the noise reduction member being arranged in a fender inner space defined between a fender panel serving as an exterior panel for a motor vehicle and an inner fender forming a wheelhouse, the noise reduction member comprising
    a first wall portion and a second wall portion which are made of a foamed material, attached to a surface facing the fender inner space to extend in such a direction as to protrude from the surface, and arranged to be spaced apart from each other, wherein
    the noise reduction member is formed by pleating the foamed material.

2. The noise reduction member of claim 1, wherein
    a surface of the foamed material includes a solid skin layer.

3. The noise reduction member of claim 1, wherein
the first wall portion and the second wall portion are arranged to be spaced apart from each other in a longitudinal direction of the motor vehicle.

4. The noise reduction member of claim 1, wherein
a sound absorbing material is arranged between the first wall portion and the second wall portion.

5. A noise reduction member for a motor vehicle fender, the noise reduction member being arranged in a fender inner space defined between a fender panel serving as an exterior panel for a motor vehicle and an inner fender forming a wheelhouse, the noise reduction member comprising:
- a first wall portion and a second wall portion which are made of a foamed material, attached to a surface facing the fender inner space to extend in such a direction as to protrude from the surface, and arranged to be spaced apart from each other; and
- a rear noise reduction member including a plurality of wall portions made of a foamed material, arranged in the fender inner space to extend vertically, and arranged to be spaced apart from each other in a longitudinal direction of the motor vehicle.

6. A noise reduction member for a motor vehicle fender, the noise reduction member being arranged in a fender inner space defined between a fender panel serving as an exterior panel for a motor vehicle and an inner fender forming a wheelhouse, the noise reduction member comprising:
- a first wall portion and a second wall portion which are made of a foamed material, attached to a surface facing the fender inner space to extend in such a direction as to protrude from the surface, and arranged to be spaced apart from each other;
- a plurality of plate members made of a foamed material; and
- a coupling member having an insert portion to be inserted into the plate members and configured to couple and combine together the plate members, wherein
the insert portion of the coupling member is plugged into, and fixed to, a surface facing the fender inner space of the motor vehicle.

7. A noise reduction member for a motor vehicle fender, the noise reduction member being arranged in a fender inner space defined between a fender panel serving as an exterior panel for a motor vehicle and an inner fender forming a wheelhouse, the noise reduction member comprising:
- a first wall portion and a second wall portion which are made of a foamed material, attached to a surface facing the fender inner space to extend in such a direction as to protrude from the surface, and arranged to be spaced apart from each other; and
- a hard plate member made of a harder material than the first and second wall portions, wherein
the hard plate member is arranged along, and supports, the first and second wall portions.

* * * * *